Feb. 17, 1970 A. R. H. REY 3,495,847
RACK OF MOTOR-VEHICLE STEERING GEAR WITH A SPINDLE
CONNECTING RODS OF VARIABLE LENGTH
Filed July 21, 1965 3 Sheets-Sheet 1

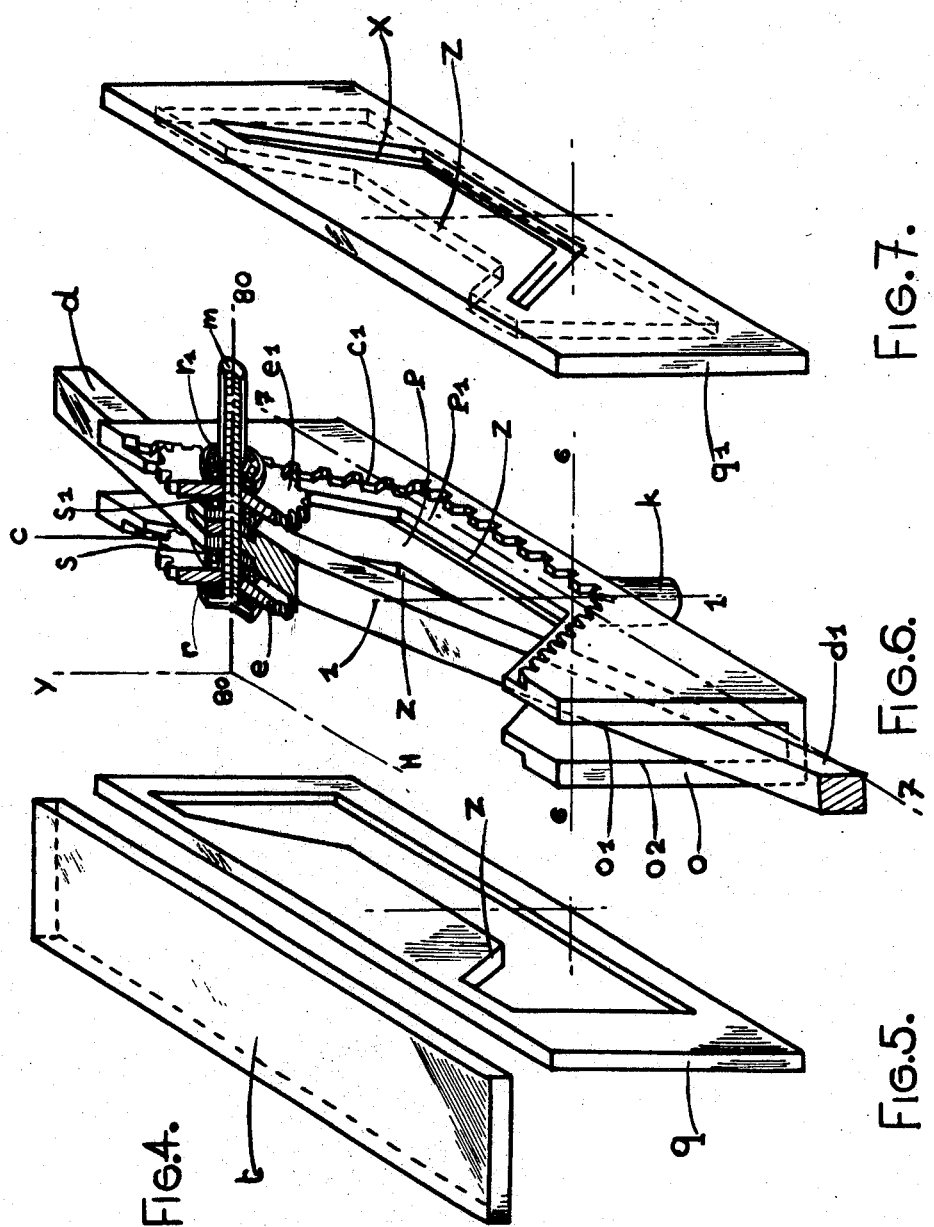

United States Patent Office 3,495,847
Patented Feb. 17, 1970

3,495,847
RACK OF MOTOR-VEHICLE STEERING GEAR
WITH A SPINDLE CONNECTING RODS OF
VARIABLE LENGTH
Andre R. H. Rey, 93 Rue de la Curveillere 81,
Albi, France
Filed July 21, 1965, Ser. No. 473,871
Claims priority, application France, July 31, 1964,
984,181
The portion of the term of the patent subsequent to Jan.
22, 1986, has been disclaimed and dedicated to the
Public
Int. Cl. B62d 3/12
U.S. Cl. 280—95                                        3 Claims

ABSTRACT OF THE DISCLOSURE

The object of the invention is the replacement of the solid and rigid coupling bar connecting both journal pivot arms in a conventional steering with a device allowing to vary the coupling distance of the journal pivot arms, thus obtaining a greater deflection than the one allowed with a solid and rigid coupling bar. The deflection being considered as reaching a maximum when the axis of the wheels intersect along the rear wheel on the deflected side.

The conventional coupling bar is replaced with a unit of rack parts shaped as a broken line and arranged on a casing holding two coupling half bars within the plane passing by the end sections of the journal pivot arms. The unit is allowed to move according to the motion of the previous conventional coupling bar but the casing remains integer with the translation motion along the longitudinal of the vehicle. Gears fast with the coupling half bars and controlled by the steering wheel are caused to mesh with the racks when moving in the direction of the desired deflection, thus driving the half bars and consequently the deflection of the wheels.

The coupling half bars and the line connecting the end sections of the journal pivot arms form an isosceles triangle. The rack gears located at the top of this triangle cause the height of the triangle to vary under the meshing action with the rack, and as a result of the metric relations for triangles the distance of the journal pivot arms is also caused to vary.

---

The invention relates to an automobile steering control through a rack allowing to vary according to a substantial value the length of the journal arms or the length of the geometrical projections from the half coupling bars.

The fundamental principle of the invention lies in the variation of the coupling distance of the arms in a motor-vehicle steering gear, in order to obtain the maximum deflexion of the front wheels and consequently, the minimum radius of deflexion of the vehicle. These conditions are fulfilled when the axles of the front controlling wheels intersect in the centre of the rear wheel on the side where the wheels are deflected.

FIGURE 4 is a perspective view of the housing-cover.

FIGURE 5 is a perspective view of the front cheek of the housing.

FIGURE 6 is a perspective view of the rack-housing with its accessories. Section perpendicular planes: vertical (80, 80)(Y) and horizontal (80, 80)(H) (FIG. 6).

FIGURE 7 is a perspective view of the rear cheek of the housing.

Figure 13:
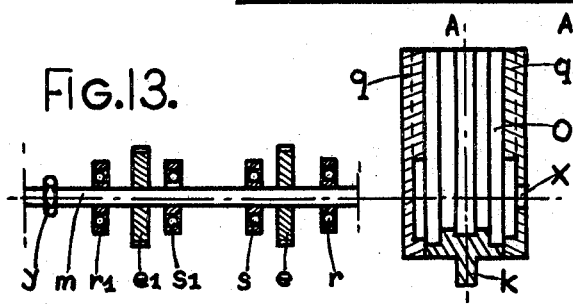

FIGURE 13. Pinions and bearings with axle. Vertical plane view section, vertical plane (80, 80)(Y) (FIG. 6).

Figure 14:
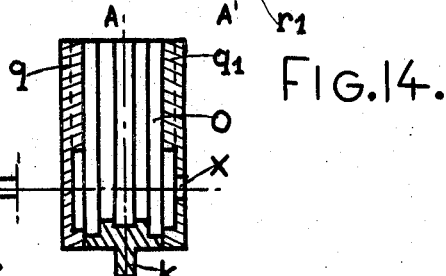

FIGURE 14 is a exploded view of the housing and cheek.

Figure 10:
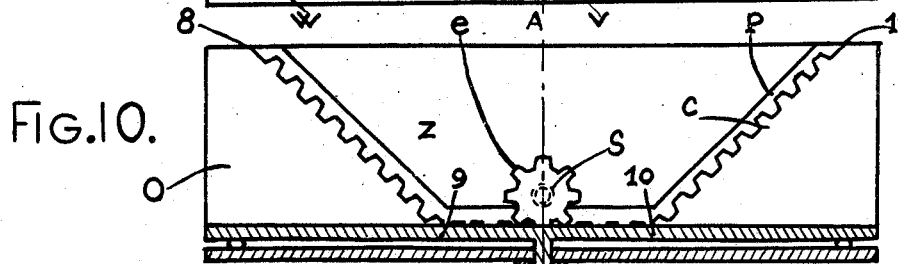
FIGURE 10 is a side view in elevation of the rack of housing section, plane: vertical (7, 7) (1, 1) (FIG. 6).
Figure 11:
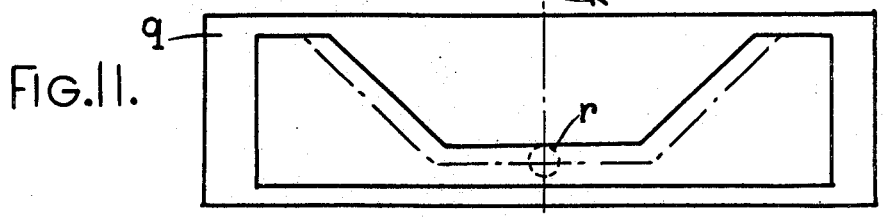
FIGURE 11 is a side view in elevation of the front cheek.
Figure 12:
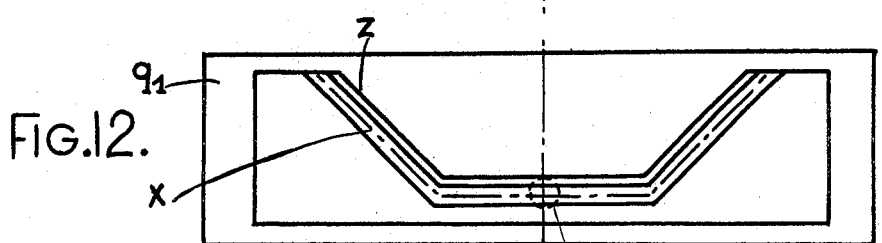
FIGURE 12 is a side view in elevation of the rear cheek.

The main part is the schematic box of the rack, designated by the letter O (FIGS. 6 and 10). It is limited by the horizontal axis 6, 6 and 7, 7 (FIG. 6) and the vertical one 1, 1 (FIG. 6). These three axis are concurrent and at right angle with respect one to the others. They limit both symmetry planes of the part which are: the transverse plane (1, 1) (6, 6) (FIG. 6), the longitudinal plane (7, 7) (1, 1) (FIG. 6). The horizontal plane is the one bearing the box O (FIG. 6), plane (6, 6) (7, 7).

The overall shape of the box, locked at side face, is the shape of the letter U (FIG. 6). Several actions are distinctly noticed:

(1) The front and rear racks respectively illustrated at C (FIG. 6) and C1 (FIG. 6). These racks are constituted by teeth cut from the metallic solid mass. The profile of the unit is shaped as a broken line (FIG. 10): one horizontal part and two inclined sections symmetrical with respect one to the other (FIG. 10). At FIGURE 10 the points 9 and 10 show the intersection of the lines from the horizontal bottom teeth with the slanted parts. The points 8 and 11 show the intersection of the lines from the bottom of the slanted sections with the upper horizontal edge of the box (FIG. 10). The overall profile of the rack is shown by the broken line 8, 9, 10, 11.

(2) The guide slide for the coupling half-bars is constituted by both vertical inner walls of the box, designated by letters O1 and O2 at FIGURE 6. This slide holds both coupling half-bars D and D1 (FIGS. 6, 8, 9) within one single plane (1, 1) (7, 7) (FIG. 6).

(3) The ball races broken lines shown by the letter Z at FIGURES 5, 7, 10, 11, 12 are machined surfaces at right angle with the plane (1, 1) (7, 7) (FIG. 6) along which travel the bearings r, s, r1, s1 (FIGS. 6, 8, 10, 11, 12, 13). The profile of these ball races is a broken line the members of which are respectively parallel to those of the broken lines 8, 9, 10, 11 (FIG. 10). Two from these ball races are designed on the box O (FIG. 6) and the two others are one the front flanges Q (FIG. 5) and rear flanges Q1 (FIG. 7).

(4) Assembling the box and its accessories: These are secured onto the box: the front flange from the box designated by the letter Q (FIGS. 5, 9, 11, 14), the rear flange of the box designated by the letter Q1 (FIGS. 7, 9, 12, 14); the plate t (FIGS. 4, 8) arranged horizontally on O (FIG. 6) is used as a cover; a cylindrical shaft m (FIGS. 6, 9, 13) the axis of which is parallel with the axis 6, 6 (FIG. 6). This shaft is fitted with (FIGS. 6, 13): the flange bearings r and r1 (FIGS. 6, 13); the box bearings s and s1 (FIGS. 6, 13); both coupling half-bars d and d1 (FIG. 6); the gears e and e1 are fast with the shaft m.

Inside operation of the box: the shaft m (FIG. 6) is impressed with the rotating motion applied around its axis, from the steering column and wheel. This shaft drives the gears $e$ and $e1$ (FIGS. 6, 10). The gears $e$ and $e1$ engage the teeth from the racks $c$ and $c1$ (FIGS. 6, 10). Both half-bars $d$ and $d1$ (FIG. 6) are also driven in this motion. The unit made of the shaft $m$ (FIG. 6) and of the parts it supports ($r, r1, s, s1, e, e1, d, d1$) (FIG. 6) undergoes a translation motion along the axis 7, 7, from top to bottom along the axis 1, 1 while following the profile of the broken line 8, 9, 10, 11 (FIG. 10). The bearings $r, r1, s, s1$ (FIG. 6) are supposed to keep the unit along the trajectory 8, 9, 10, 11. The rear flange $q1$ (FIGS. 7, 12, 14) is provided with a groove $x$ (FIGS. 7, 14) allowing the passage of shaft $m$. The shaft $m$ is provided with a thread and a nut $y$ (FIG. 13) allowing to clamp sideways the parts $r, r1, s, s1, e, e1$, thus removing any play liable to hamper proper operation.

Figure 1:
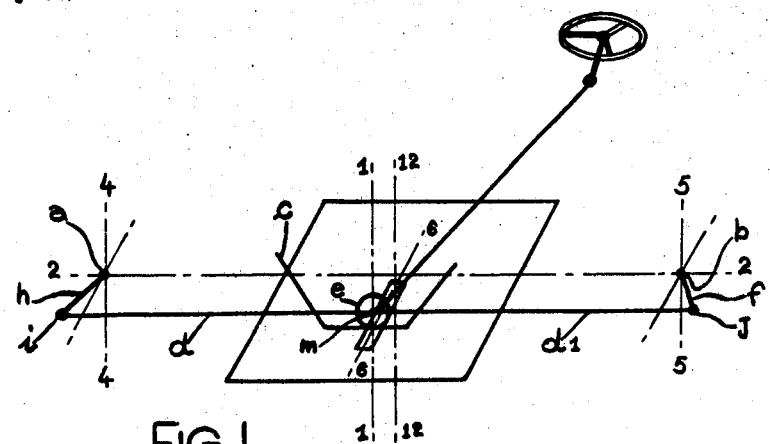
FIGURE 1 is a schema perspective view illustrating the rack system of the present invention associated with a steering system in non-steering position.
Figure 2:
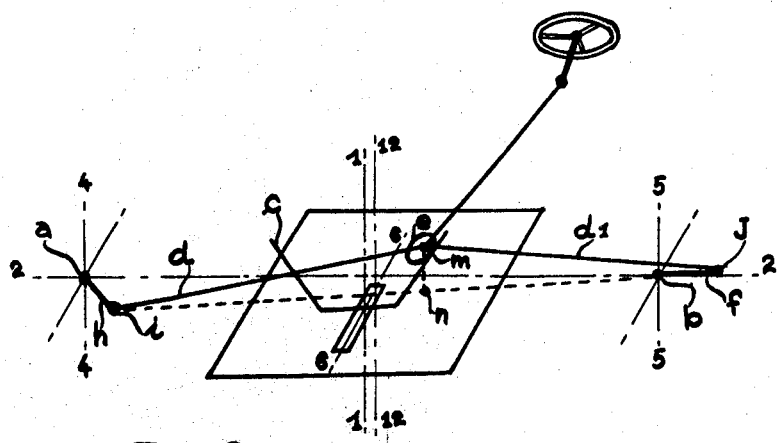
FIGURE 2 is a schema perspective view illustrating the rack system of the present invention associated with a steering system in left steering position.
Figure 8:
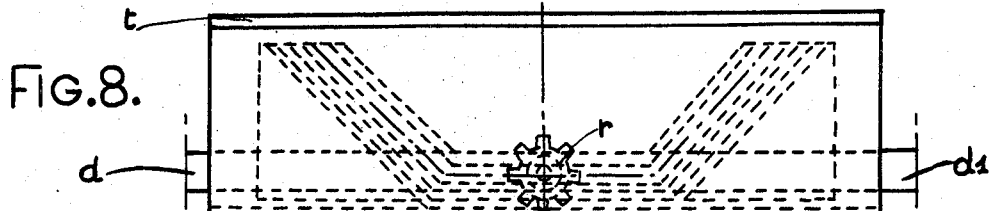
FIGURE 8 is a side view in elevation illustrating the rack system of the present invention.
Figure 9:
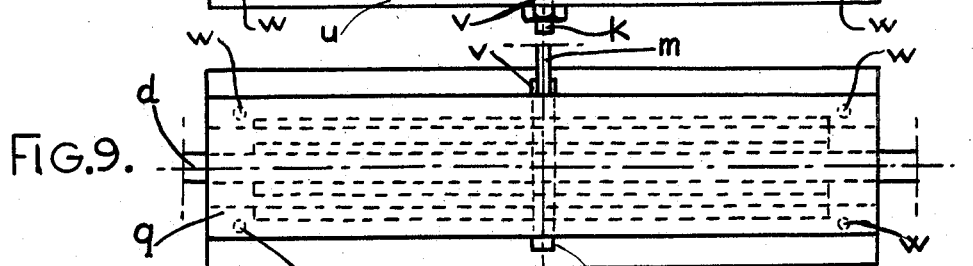
FIGURE 9 is a plan view of the rack system illustrated in FIGURE 8.

Travelling of the box and of the coupling bars: FIGURE 1 shows the diagram for the steering with wheels non deflected: Pivot journal shafts 4, 4 and 5, 5; journal pivots $a$ and $b$; pivot journal arms $h$ and $f$ (arms at right angle with axis (4, 4) and 5, 5) (FIG. 1); joints $i$ and $j$ (FIG. 1); coupling half bars $d$ and $d1$ (FIG. 1); rack $c$ with gear $e$; shaft $m$ and securing shaft of the box $k$ (FIGS. 6, 8, 10, 14). The coupling half bars extend one after the other and the line $i, m, j$ (FIG. 1) is straight. When deflection becomes maximum (FIGURE 2) the pivot journal arm $f$ (FIG. 2) extends further to the shaft 2, 2 connecting the journal pivots The coupling half bars $d$ and $d1$ (FIG. 2) are in a plane at right angle with the plane of the journal arms $h$ and $f$ (FIG. 2) and slanting with relation to the plane of the shafts 4, 4 and 5, 5. The rack and its box, locked with the half bars $d$ and $d1$ is driven in this motion. Its securing shaft $k$ (FIGS. 1, 2, 6, 8, 10, 14) comes nearer to the shaft 2, 2 (FIG. 2). But the shaft $k$ (FIGS. 1, 2, 6, 8, 10, 14) is compelled to move in a slide (6, 6) (FIGS. 1, 2, 3) since it is in its axis represented by $v$ (FIGS. 8, 9). This slide is embedded in the supporting plate of the box $u$ (FIG. 8). The box unit pivots around shaft $k$ (FIG. 2), takes a slanted position with relation to shaft 2, 2 (FIG. 2) but in nearing this shaft it cannot be released from being guided by the groove V (FIGS. 8, 9) and its axis 6, 6 (FIG. 2).

The rotating motion and the travel in a slanted direction of the bor O (FIGS. 6, 8) upon the supporting plate $u$ (FIG. 8) is made easier by the presence of balls $w$ (FIGS. 8, 9).

Figure 3:
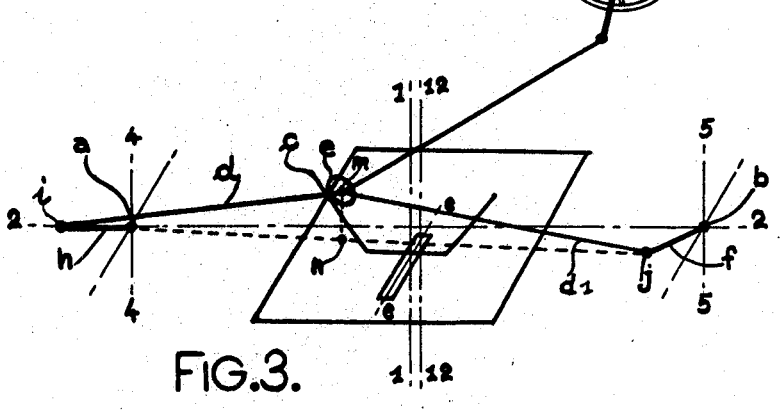
FIGURE 3 is a schema perspective view illustrating the rack system of the present invention associated with a steering system in right steering position.

Distance variation between points $i$ and $j$: (FIGS. 2, 3). At FIGURE 1 both half bars $d$ and $d1$ extending one after the other, the points $i, m, j$ are on a stright line: the distance between the points $i$ and $j$ is equal to the length of the line $i, j$. At FIGURE 2 the distance between the points $i$ and $j$ is equal to the length of the geometrical projections of both coupling bars $d$ and $d1$. Since the point $n$ (FIG. 2) is the projection on the plane from the journal arms $h$ and $f$ of the center of the gear $e$ (FIG. 2). This projection is represented at FIGURE 2 by the line in dotted points $i, n, j$. The $i, n, j$ (FIG. 2) line projection is shorter than the broken line $i, m, j$ (FIG. 2). Therefore the points $i$ and $j$ (FIG. 2) are nearer one another than in the position showed at FIGURE 1. Their coupling distance has reduced. Calculating this new distance is made according to the metric ratios for rectangle triangles $i, n, m$ (FIG. 2) and $n, m, j$ (FIG. 2).

FIGURE 3 shows the position of greatest deflection for the pivot journal arm $h$.

I claim:

1. In a steering equipment for motorcar vehicle and the like comprising a steering wheel, two journal pivot shafts assembled with two journal pivot arms on either side of said vehicle, a U-shaped rack and coupling rods connected to the rack by a pinion and pivot to each of the pivot journal arms causing the coupling distance of said journal pivot arms to vary and reach the maximum deflection of the front wheels of said vehicle and consequently the minimum deflection radius of said vehicle when the axis from the steering front wheels intersect at the center of the rear wheel on the side of the deflection.

2. A steering equipment as claimed in claim 1 in which said rack device comprises a parallelpipedic casing arranged vertically and transversely with relation to the longitudinal axis of the vehicle onto an horizontal supporting frame secured to said vehicle, balls allowing said casing to slide along said plane, a vertical shaft holding said casing on said plate in pivoting relation, an horizontal slide in a parallel direction with relation to the longitudinal axis of the vehicle in which said shaft can slide, two vertical inner faces supported inside said casing and directed transersally with relation to the longitudinal axis of the vehicle, said inner faces constituting a slide, two coupling half-bars connected one to the other and guided and held together in a vertical and transverse plane with relation to the lnogitudinal axis of the vehicle by said inner faces constituting a slide, two identical racks in said casing forming a broken line composed of one center horizontal section and one ascending inclined section at either end, said racks arranged in parallel planes with relation to said vertical faces constituting a slide on either side of said faces towards the inside of the casing, two identical ball races having their race area at right angle with relation to said faces of said vertical slides, said ball races forming a broken line matching the said broken line of said racks and located in planes parallel to said vertical slides, on either side thereof, towards the inside of the casing, two flanges applied and bearing against said vertical faces, exterior thereto in a transverse direction with relation to the longitudinal axis of the vehicle, two further identical ball races supported each one by one of said flanges with their race area at right angle with relation to said vertical slides, said further ball races forming a broken line from the racks, a cover plate arranged horizontally at the top of said casing, two identical gears, a steering wheel fast onto a steering column, a shaft connected to said steering column integer with said steering wheel, said gears being keyed onto said shaft and arranged at right angle with relation to said vertical faces of said casing, each gear meshing with one of said racks and four roller bearings arranged on said shaft by pair on either side of each of said gears.

3. A steering equipment according to claim 2 in which both said roller bearings between the said gears along the ball races from the said casing and both said roller bearings outside the said gears travel along the ball races of said flanges, said roller bearings and said ball races holding adequately said gears meshed with said racks.

References Cited

UNITED STATES PATENTS

| 1,601,510 | 9/1926 | Rhodes | 280—103 X |
| 2,730,186 | 1/1956 | Morgen | 280—96 X |

FOREIGN PATENTS

| 451,813 | 8/1936 | Great Britain. |
| 1,228,837 | 3/1960 | France. |

KENNETH H. BETTS, Primary Examiner